United States Patent
Lee et al.

(10) Patent No.: US 9,004,762 B1
(45) Date of Patent: Apr. 14, 2015

(54) LINEAR MOTION MODULE

(71) Applicant: TBI Motion Technology Co., Ltd., New Taipei (TW)

(72) Inventors: Ching-Sheng Lee, New Taipei (TW); Chin-Tsai Yang, New Taipei (TW)

(73) Assignee: TBI Motion Technology Co., Ltd., New Taipei (TW)

( * ) Notice: Subject to any disclaimer, the term of this patent is extended or adjusted under 35 U.S.C. 154(b) by 0 days.

(21) Appl. No.: 14/101,307

(22) Filed: Dec. 9, 2013

(51) Int. Cl.
*F16C 29/06* (2006.01)
*F16C 33/10* (2006.01)
*F16C 33/66* (2006.01)

(52) U.S. Cl.
CPC ........... *F16C 29/064* (2013.01); *F16C 33/6696* (2013.01)

(58) Field of Classification Search
CPC ............. F16C 29/0602; F16C 29/0604; F16C 2/0609; F16C 29/0611; F16C 29/0642; F16C 29/0645; F16C 29/0647; F16C 29/0659; F16C 29/0661; F16C 29/0664; F16C 33/6681
USPC .............................................. 384/13, 43, 45
See application file for complete search history.

(56) References Cited

U.S. PATENT DOCUMENTS

| 6,524,003 | B2* | 2/2003 | Michioka et al. | 384/45 |
| 7,237,954 | B2* | 7/2007 | Hsin-Liang et al. | 384/45 |
| 2008/0037914 | A1* | 2/2008 | Horie et al. | 384/45 |
| 2008/0292227 | A1* | 11/2008 | Chen | 384/45 |

* cited by examiner

*Primary Examiner* — Phillip A Johnson
(74) *Attorney, Agent, or Firm* — Cheng-Ju Chiang

(57) ABSTRACT

A linear motion module comprises a linear rail, a sliding block and balls. The sliding block is slidingly disposed on the linear rail and comprises a sliding block body, circulation elements and end caps. The inside of the sliding block body is configured with inner circulation grooves, the inner circulation groove and the rail groove constitute an inner circulation passage, and each of two sides of the sliding block body is configured with at least a circulation channel that corresponds to the inner circulation passage and penetrates through the sliding block body. Each of the circulation elements includes at least a circulation tube, and the opposite two circulation tubes are connected to each other to constitute an outer circulation passage. Each of the end caps is configured with at least two circulation guiding grooves, and the circulation guiding groove is connected to the inner and outer circulation passages.

13 Claims, 8 Drawing Sheets

LINEAR MOTION MODULE

BACKGROUND OF THE INVENTION

1. Field of Invention

The invention relates to a linear motion module.

2. Related Art

In the linear motion module, a ball circulation passage is disposed so that the sliding block can move frontward on the linear rail through the balls of a limited number. By the ball circulation passage, the balls can return to between the linear rail and the sliding block so as to function again after the sliding block moves.

FIG. 1 is a sectional diagram of a conventional linear motion module. As shown in FIG. 1, the linear motion module 1 includes a linear rail 11, a sliding block 12 and a plurality of balls 13. The linear rail 11 is configured with a rail groove 111, the inside of the sliding block 12 is configured with an inner circulation groove 121, and the rail groove 111 and the inner circulation groove 121 constitute an inner circulation passage R for the balls moving through. Besides, the sliding block 12 is configured with an outer circulation passage 122. The balls 13 sequentially pass through a circulation guiding curve (not shown) and the outer circulation passage 122 and then return to between the linear rail 11 and the sliding block 12.

In the prior art, the drilling machining is used to form the outer circulation passage 122 for the highly-rigid sliding block 12. During the process, an end surface of the sliding block 12 is regarded as the base surface and the drilling is performed on the other end surface to form the outer circulation passage 122 penetrating through the sliding block 12 to, or the two end surfaces are alternately regarded as the base surfaces and the drillings are performed on the two end surfaces so that the holes can communicate with each other to form the outer circulation passage 122.

However, there are some problems for the conventional art to form the outer circulation passage. First, the drilling machining easily causes the taper at the two ends of the outer circulation passage, so the passage diameter is not uniform and the circulation motion of the balls is thus unstable. Second, because the drilling machining can not be completed just by a single end surface, the sectional difference will occur in the passage and therefore the smooth level of the outer circulation passage is decreased. The above-mentioned problems also result in the much noise, pause and/or instability during the motion of the linear motion module and even result in the damage of the components.

Although there are some technologies developed to improve the above-mentioned problems, the practice still encounters some difficulty, such as complicated machining procedures or too many kinds of components. So, it is still insoluble to reduce the influence of the defect of the outer circulation passage on the motion of the balls.

Therefore, it is an important subject to provide a linear motion module that has no sectional difference so as to increase the motion stability, reduce the noise and suit the high-speed motion.

SUMMARY OF THE INVENTION

In view of the foregoing subject, an objective of the invention is to provide a linear motion module that has no sectional difference so as to increase the motion stability, reduce the noise and suit the high-speed motion. Besides, in the linear motion module, the self-lubricating element is used to act a part of the outer circulation passage to enhance the motion smoothness of the balls by automatically providing the lubricant. More importantly, the connection between the inner circulation passage and the circulation curving groove has no sectional difference, and therefore the above advantages can be further enhanced.

Another objective of the invention is to provide a linear motion module where the sliding block body and the circulation elements are combined together by adhering or a post-forming process, and therefore the labor, time, cost and tolerance resulted from the multiple assemblies can be all avoided.

Another objective of the invention is to provide a linear motion module including the integrally-formed end cap and ball holder, and therefore the number of the components, the cost and the machining steps can be all reduced.

To achieve the above objective, a linear motion module according to the invention comprises a linear rail, a sliding block and a plurality of balls. Two sides of the linear rail are configured with at least a rail groove each. The sliding block is slidingly disposed on the linear rail and comprises a sliding block body, at least four circulation elements and two end caps. The inside of the sliding block body is configured with at least two inner circulation grooves corresponding to the rail groove, the inner circulation groove and the rail groove constitute an inner circulation passage, and each of two sides of the sliding block body is configured with at least a circulation channel that corresponds to the inner circulation passage and penetrates through the sliding block body. The circulation elements are disposed on the two sides of each of two end surfaces of the sliding block body, respectively. Each of the circulation elements includes at least a circulation tube disposed in the corresponding circulation channel, and the opposite two circulation tubes are connected to each other to constitute an outer circulation passage. The end caps are disposed on the two end surfaces of the sliding block body, respectively. Each of the end caps is configured with at least two circulation guiding grooves, and the circulation guiding groove is correspondingly connected to the inner circulation passage and the outer circulation passage. The balls move in circles through the inner circulation passage, one of the circulation guiding grooves, the outer circulation passage and the other circulation guiding groove.

In one embodiment, the opposite two circulation tubes have corresponding tapers at the connection and are connected together by a sleeve manner to constitute the outer circulation passage.

In one embodiment, the opposite two circulation tubes are integrally formed. In another embodiment, the opposite two circulation tubes are connected to each other by adhering.

In one embodiment, the sliding block further includes at least two self-lubricating elements, which are disposed in the circulation channels respectively, and the opposite two circulation tubes are connected together through the self-lubricating element. The opposite two circulation tubes are formed in the sliding block body by injection molding to be combined with the self-lubricating element and the sliding block body as one piece. Meanwhile, the two circulation tubes are fixed to and connected to the self-lubricating element, and all of them constitute the outer circulation passage. In another embodiment, two ends of the self-lubricating element have tapers to be covered by the opposite two circulation tubes, respectively, and the self-lubricating element and the opposite two circulation tubes constitute the outer circulation passage.

In one embodiment, each of the circulation elements includes at least one circulation curving groove, one end of the circulation curving groove is connected to the circulation tube, and the circulation curving groove and the circulation guiding groove constitute a circulation curving passage which connects to the inner circulation passage and the outer circulation passage. Each of two ends of each of the inner circulation grooves includes an indentation, the other end of the circulation curving groove includes a protrusion, and the circulation curving passage is connected to the inner circulation passage by the connection between the indentation and the protrusion. Favorably, the connection between the indentation and the protrusion has no sectional difference substantially.

In one embodiment, the inside of the sliding block body is configured with at least two ball holders corresponding to the rail groove for limiting the movement of the balls relative to the sliding block body.

In one embodiment, each of the end caps further has at least two ball holder portions integrally formed with the end cap, the opposite two ball holder portions parallel to the circulation channel are connected to each other to constitute a ball holder. One of the opposite two ball holder portions includes a protrusion, the other ball holder portion includes an indentation, and the ball holder portions constitute a ball holder by the connection between the protrusion and the indentation.

As mentioned above, according to the linear motion module of the invention, the circulation element can replace the circulation channel to act a part of the outer circulation passage, so the machining defect of the circulation channel is not a problem anymore and the circulation passage can have uniform diameter. Besides, because the manufacturing method and connection relationship of the circulation element are favorable to form the passage wall without sectional difference, the noise during the motion of the linear motion module can be reduced and the motion stability of the balls can be enhanced. Furthermore, when the positioning structure and/or the self-lubricating element are applied in the invention, the positioning and/or lubricating functions can be provided. Moreover, because the opposite two circulation elements and/or the end caps with the ball holders can be made by an integrally forming manner, the number of the components, the cost and the machining steps can be all reduced and therefore the tolerance caused by the multiple assemblies can be avoided.

In comparison with the prior art, due to the structural design, the linear motion module of the invention can overcome the disadvantages such as the taper of the tube diameter or the roughness of the passage surface, which are unfavorable to the motion of the balls, and therefore the noise during the motion can be reduced and the motion stability can be increased. Besides, by the self-lubricating element providing the lubricant, the interference between the balls or between the balls and the circulation passage can be reduced. When the integrally forming method is applied to the linear motion module of the invention, the number of the components can be reduced and the components within the sliding block can be combined as a single piece. Therefore, the circulation passage can tightly fit the sliding block body to obtain stronger supporting force, and thus the passage vibration during the motion of the balls can be avoided.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
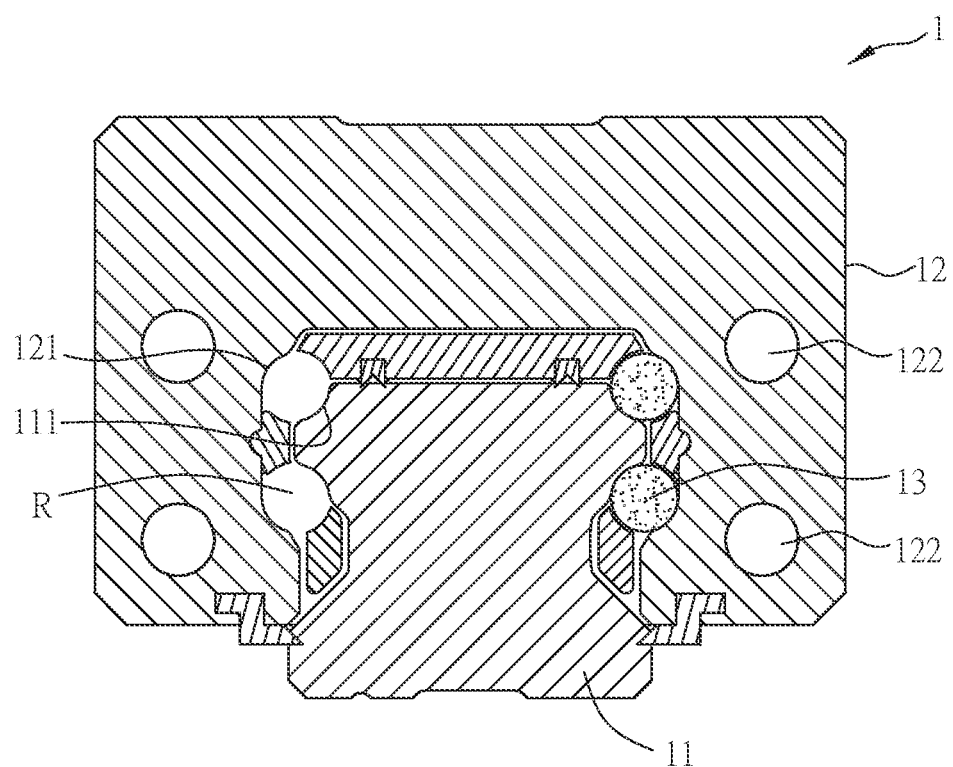
FIG. 1 is a sectional diagram of a conventional linear motion module.
Figure 2:
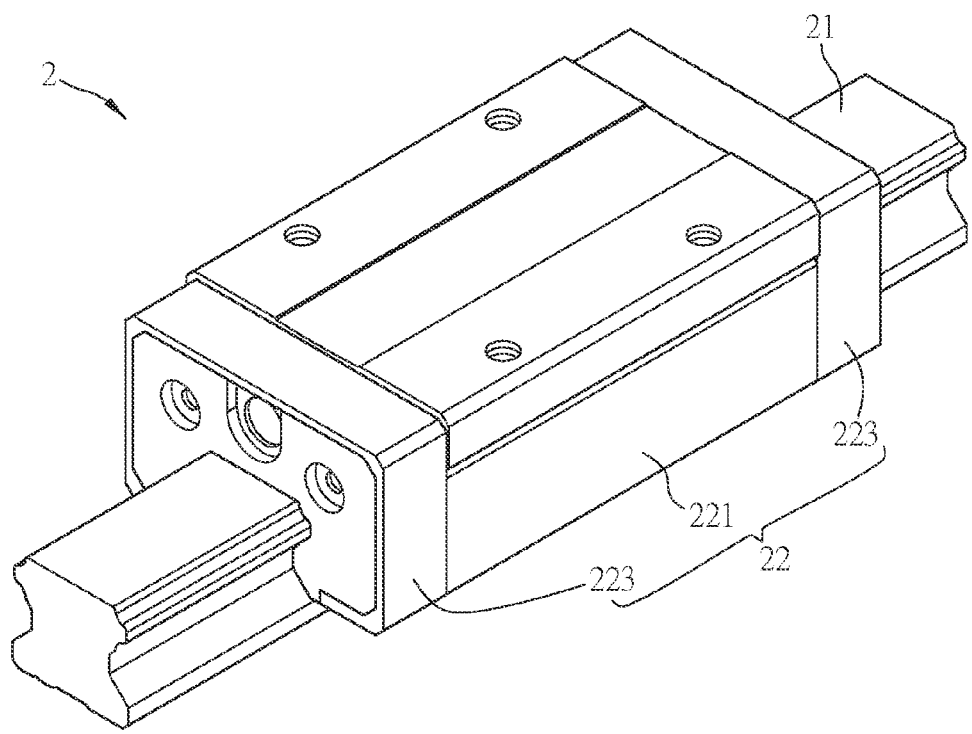
FIG. 2 is a schematic diagram of a linear motion module according to an embodiment of the invention.
Figure 3:
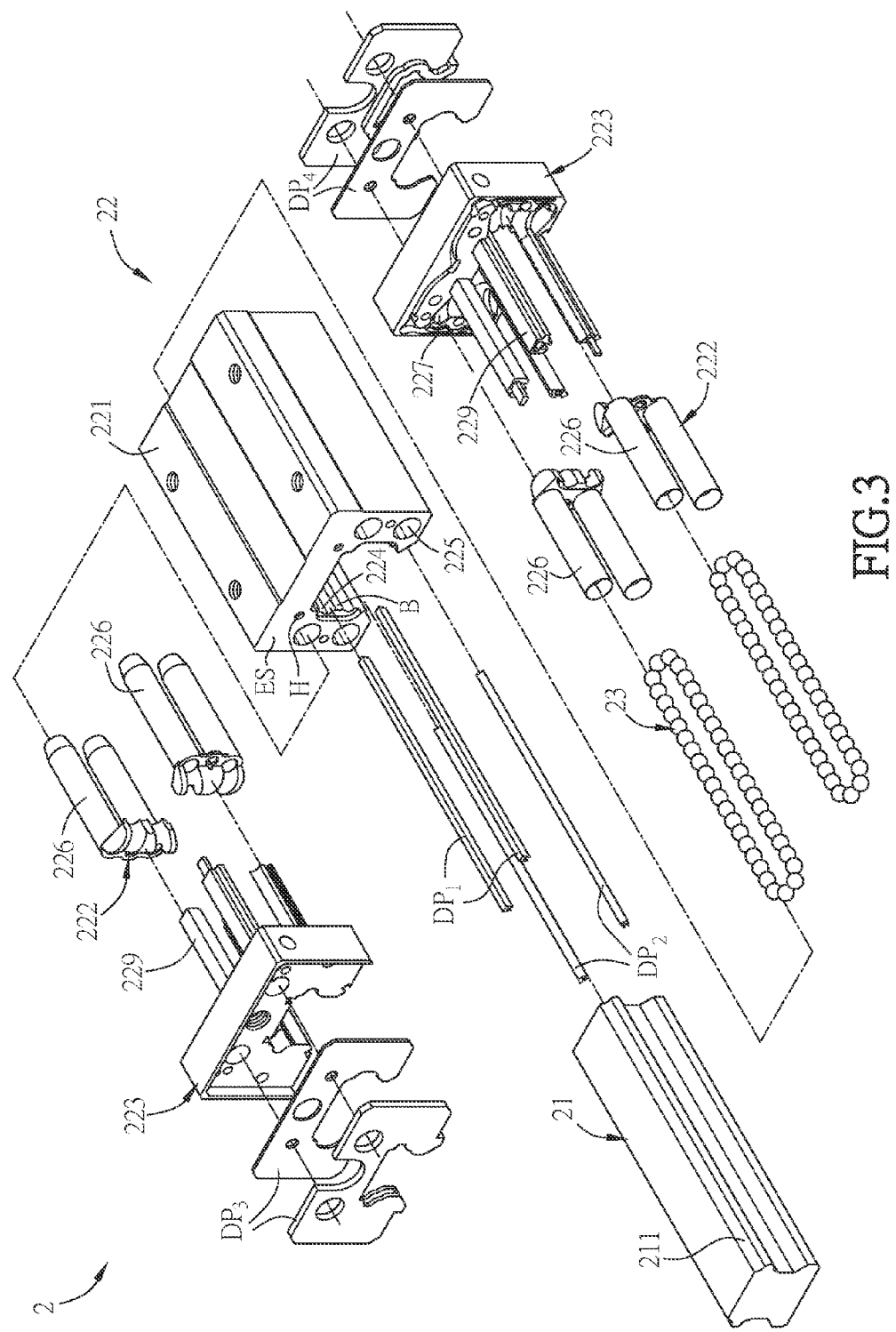
FIG. 3 is a schematic exploded diagram of the linear motion module in FIG. 2.

FIG. 2 is a schematic diagram of a linear motion module according to an embodiment of the invention, and FIG. 3 is a schematic exploded diagram of the linear motion module in FIG. 2. As shown in FIGS. 2 and 3, the linear motion module 2 includes a linear rail 21, a sliding block 22 and a plurality of balls 23. Each of two sides of the linear rail 21 is configured with at least a rail groove 211. The sliding block 22 is slidingly disposed on the linear rail 21, and includes a sliding block body 221, at least four circulation elements 222 and two end caps 223. The inside of the sliding block body 221 is configured with at least two inner circulation grooves 224. The inner circulation groove 224 and the rail groove 211 constitute an inner circulation passage. Besides, each of two sides of the sliding block body 221 is configured with at least a circulation channel 225 that corresponds to the inner circulation passage and penetrates through the sliding block body 221. The circulation elements 222 are disposed on the two sides of each of the two end surfaces ES. Each of the circulation elements 222 includes at least a circulation tube 226, which is disposed within the corresponding circulation channel 225. The two opposite circulation tubes 226 communicate with each other to constitute an outer circulation passage. The end caps 223 are disposed on the two end surfaces ES of the sliding block body 221, respectively, and each of the end caps 223 is configured with at least two circulation guiding grooves 227. The circulation guiding groove 227 is coupled with the inner circulation passage and the outer circulation passage. During the circulation, the balls 23 move through the inner circulation passage, one of the circulation guiding grooves 227, the outer circulation passage and another circulation guiding groove 227.

In the linear motion module 2 according to the invention, each of the two sides of the linear rail 21 can be configured with one or more rail grooves 211. In this embodiment, each of the two sides of the linear rail 21 is configured with two rail grooves 211 for example. In other embodiments, each of the two sides of the linear rail 21 can be configured with the rail grooves 211 of another number.

Figure 4:
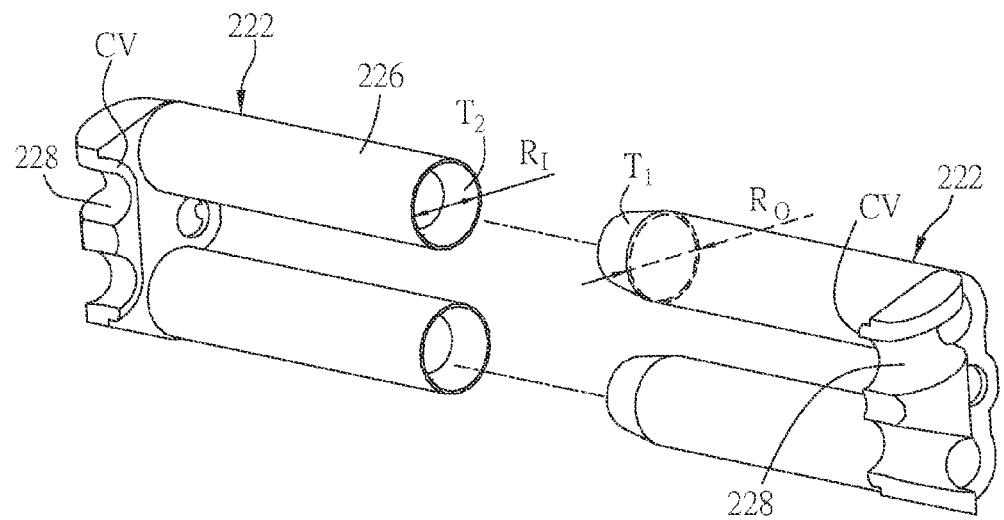
FIG. 4 is a schematic diagram of the opposite two circulation elements in FIG. 3.

As shown in FIGS. 3 and 4, the inside of the sliding block body 221 is configured with at least two inner circulation grooves 224 corresponding to the rail grooves 211, and the inner circulation groove 224 and the rail groove 221 constitute an inner circulation passage. Each of the two sides of the sliding block body 221 is configured with at least a circulation channel 225 that corresponds to the inner circulation passage and penetrates through the sliding block body 221. In this embodiment, the inside of the sliding block body 221 is configured with four inner circulation grooves 224, which correspond to the four rail grooves 211 and are disposed on the left and right sides, respectively. These four inner circulation grooves 224 and the four rail grooves 211 constitute four inner circulation passages totally. Besides, each of the right and left sides of the sliding block body 221 is configured with two circulation channels 225 penetrating through the sliding block body 221, and the four circulation channels 225 correspond to the four inner circulation passages, respectively. In this embodiment, the sliding block body 221 is favorably an iron piece, steel piece or metal piece, and the inner circulation grooves 224 thereof are made by grinding machining in order to reduce the sectional difference and thermal deformation. As for the circulation channel 225, it is formed by regarding the two end surfaces ES of the sliding block body 221 as the base surfaces alternately, then performing drillings on the two end surfaces ES alternately, and last communicating with the holes caused by the drillings along the lengthwise direction of the sliding block body 221.

As shown in FIG. 4, the circulation element 222 constitutes a part of the ball circulation passage. Each of the circulation elements 222 includes a circulation tube 226 as the rail through which the balls 23 move in the sliding block body 221. When the two circulation elements 222 are assembled together, the two circulation tubes 226 thereof can replace the circulation channel 225 and directly contact the balls 23, so that the roughness and/or thermal deformation of the surface of the circulation channel 225 caused by the drilling is not a problem anymore, and therefore a better circulation passage can be provided.

Figure 5:
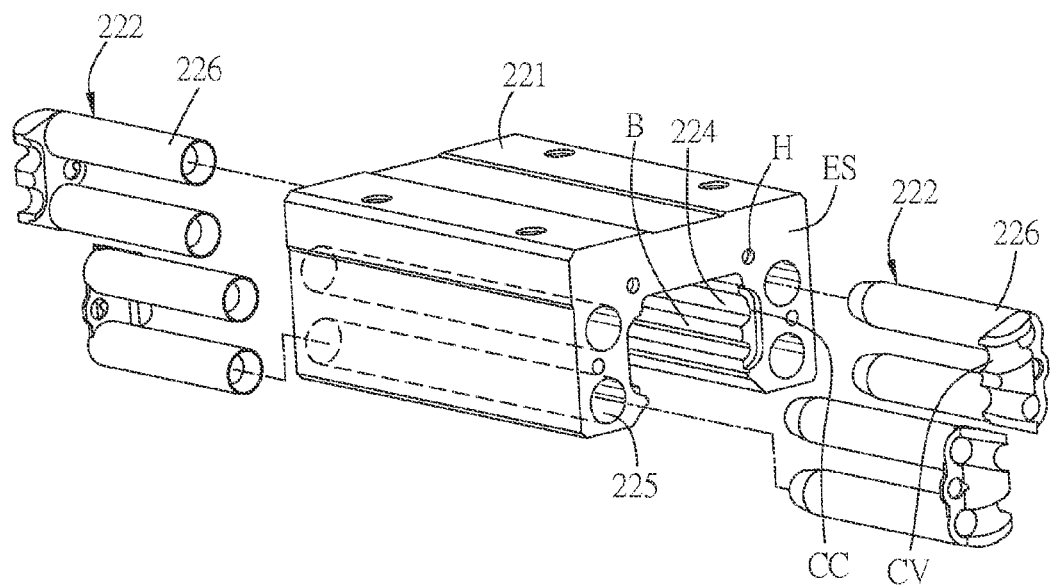
FIG. 5 is a schematic diagram of the connection of the sliding block body and the circulation elements in FIG. 3.

As shown in FIGS. 4 and 5, in this embodiment, the four circulation elements 222 are disposed on the right and left sides of the front and rear end surfaces ES of the sliding block body 221, respectively. Besides, each of the circulation elements 222 includes two circulation tubes 226, which are disposed in the corresponding circulation channels 225.

As shown in FIGS. 4 and 5, in this embodiment, two opposite circulation tubes 226 along the lengthwise direction of the sliding block body 221 can be connected together in the circulation channel 225 to constitute an outer circulation passage. The two opposite circulation tubes 226 have tapers $T_1$ and $T_2$ at the connection, respectively, and the tapers $T_1$ and $T_2$ correspond to each other. In detail, the taper T1 belongs to the circulation tube 226 having the relatively smaller outer diameter $R_o$ at the connection, and the outer diameter $R_o$ gradually narrows in the opening direction of the circulation tube 226, so that the outer tube wall at the connection becomes taper-like (as the taper $T_1$ in FIG. 4). The other circulation tube 226 has the larger inner diameter $R_I$ at the connection, and the inner diameter $R_I$ gradually narrows in the opposite direction of the opening of the circulation tube 226, so that the inner tube wall at the connection becomes inversely taper-like (as the taper $T_2$ in FIG. 4). Accordingly, the circulation tubes 226 can be connected together by the tapers $T_1$ and $T_2$ in a sleeve manner and even adhere to each other by using, for example unlimitedly, a paste or adhesive to constitute the outer circulation passage. However, the invention is not limited thereto, and other structures or technologies that can connect the opposite circulation elements 222 also can be used.

As shown in FIG. 4, in this embodiment, each of the circulation elements 222 includes at least a circulation curving groove 228. One end of the circulation curving groove 228 is connected to the circulation tube 226. When the end cap 223 is installed to the end surface ES of the sliding block body 221, the circulation curving groove 228 and the circulation guiding groove 227 will constitute a circulation curving passage. The circulation curving passage is substantially a curving tube with the shape of "U" or a hoof, and the two ends of the circulation curving passage are coupled to the inner circulation passage and the outer circulation passage, respectively, to smoothly change the moving direction of the balls 23.

Favorably, the circulation tube 226 and the circulation curving groove 228 are a single piece formed by injection molding, and the material thereof is plastic or resin material. In other embodiments, the circulation tube 226 and the circulation curving groove 228 can be made individually and then connected together. The circulation tube 226 and/or the circulation curving groove 228 also can be made by other materials and methods, such as by metal material and grinding machining. However, the invention is not limited thereto.

Furthermore, in other embodiments, in order to intensify the ability of guiding the balls 23, the circulation guiding groove 227 and/or the circulation curving groove 228 can further include a plurality of circulation guiding members (not shown), which are disposed in the circulation element 222 at proper angles to reduce the influence of the moving direction change on the balls 23.

Figure 6:
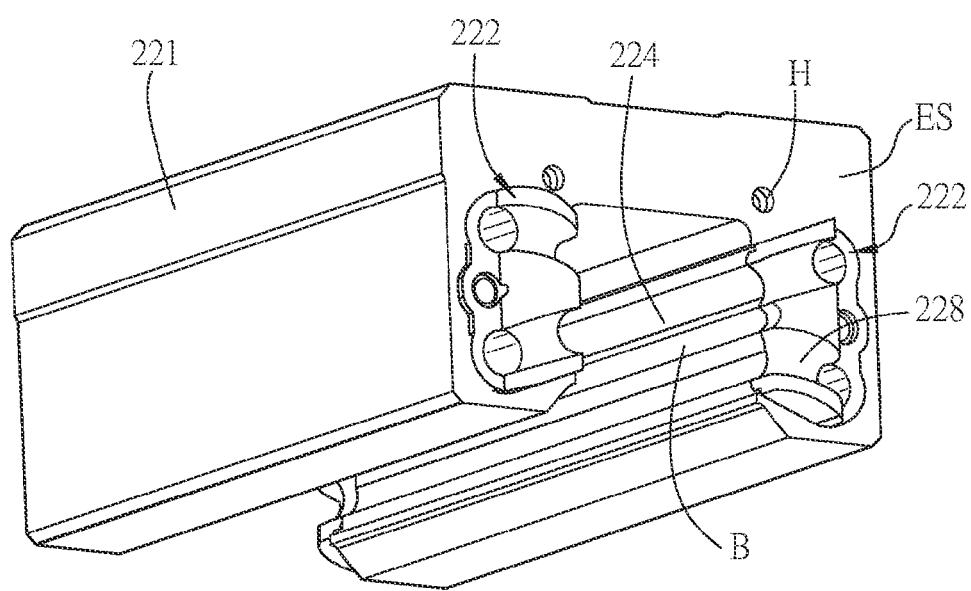
FIG. 6 is a schematic diagram of the combination of the sliding block body and the circulation elements in FIG. 3.

As shown in FIGS. 5 and 6, each of the circulation elements 222 can be disposed to the end surface ES of the sliding block body 221 by fastening, engaging, adhering, locking, embedding, or their combinations, and the connection therebetween is performed from the end surface ES to the inside. In this embodiment, the connection between the circulation element 222 and the sliding block body 221 is achieved by engaging.

Figure 7:
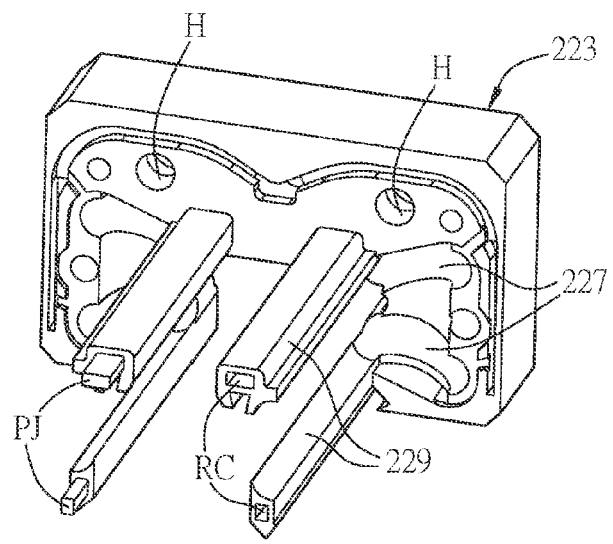
FIG. 7 is a schematic diagram of the end cap in FIG. 3.

In detail, each of the two ends of the inner circulation groove 224 includes an indentation CC. Each of the circulation elements 222 includes a protrusion CV corresponding to the indentation CC, and the circulation element 222 is disposed on the end surface ES of the sliding block body 221 by the connection between the protrusion CV and the indentation CC, as shown in FIG. 6. Besides, the protrusion CV and the indentation CC can provide positioning function so that the assembly precision of the circulation element 222 and the sliding block body 221 can be enhanced. Furthermore, since the circulation element 222 is formed by injection molding, it has a smooth surface and no deformation, so it can tightly fit the circulation channel 225 that is made by grinding machining. Therefore, as shown in FIGS. 5 and 7, there is no sectional difference between the indentation CC and the protrusion CV in this embodiment. In other words, the connection between the sliding block body 221 and the circulation element 222 can be perfectly achieved without sectional difference substantially so that the motion stability of the balls 23 can be enhanced and the noise can be reduced. To be noted, the shape and size of the indentation CC and protrusion CV can be adjusted according to the practical requirements, and the "no sectional difference substantially" condition should be comprehended that allows some tolerance caused by machining, assembly precision or other external factors.

The circulation tube 226 also can be connected to the circulation channel 225 by pasting or adhering to intensify the connection between the circulation element 222 and the sliding block body 221 and reduce the instability of the whole structure during the motion of the balls 23.

To be noted, in the above embodiment, the circulation element 222 and the sliding block body 221 are individually formed and then assembled together, but they also can be formed together by injection molding in other embodiments. In one embodiment, the sliding block body 221 is inserted in the mold and then the resin is added in the mold, so that the corresponding circulation element 222 can be formed integrally and connected with the sliding block body 221. Therefore, the number of the components of the linear motion module 2, the assembly time and the cost can be all reduced.

Figure 8:
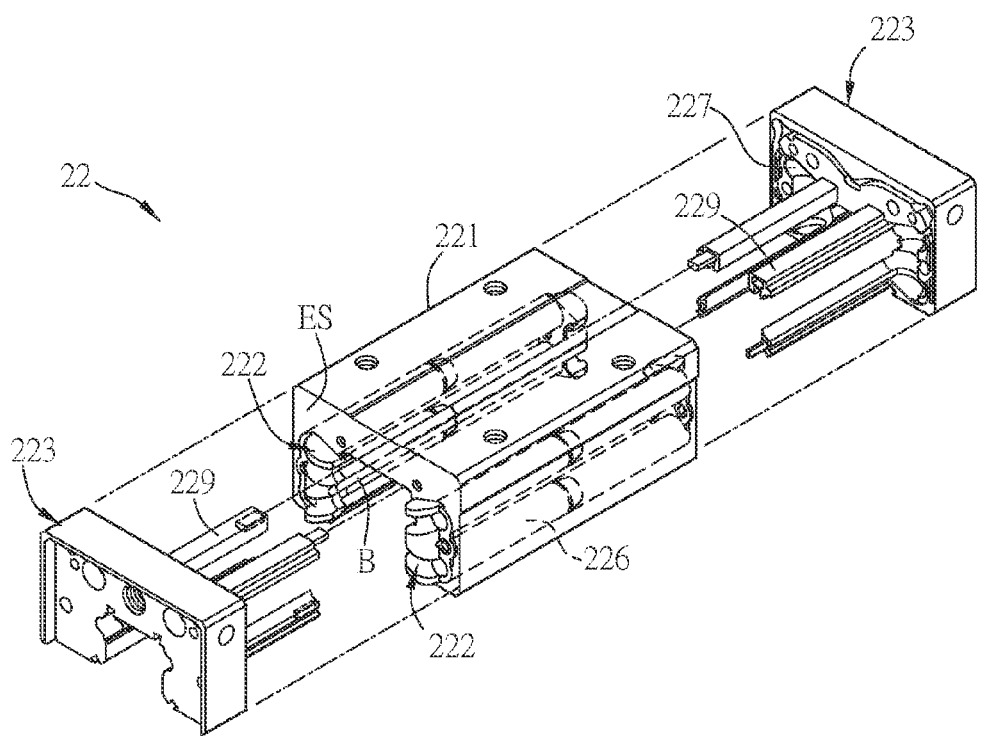
FIG. 8 is a schematic diagram of the connection of the sliding block body and the end caps in FIG. 6.

As shown in FIGS. 7 and 8, after the circulation elements 222 are disposed in the sliding block body 221, the end caps 223 can be installed to the front and rear end surfaces ES of the sliding block body 221 by fastening, engaging, adhering, locking, embedding or their combinations, and therefore the circulation guiding grove 227 of the end cap 223 and the circulation curving groove 228 of the circulation element 222 can constitute the circulation curving passage for guiding the balls 23. Moreover, in this embodiment, the sliding block body 221 and the end cap 223 both include screw holes H so that the front and rear sides of the sliding block body 221 can be connected to the end caps 223 through the screw holes H, and meanwhile the circulation elements 222 are fixed. Accordingly, the connection between the circulation elements 222 and the sliding block body 221 is further stabilized and intensified.

According to the form and structure of the linear motion module 2 of the embodiment, it is better for the linear motion module 2 to cooperate with three ball holders, which are disposed on the upper side, middle side and lower side of the inside of the sliding block body 221, respectively. According to the location, the three ball holders can be regarded as the upper ball holder, middle ball holder and lower ball holder, respectively. As shown in FIG. 8, in this embodiment, each of the end caps 223 can further include at least two ball holder portions 229 and favorably include four ball holder portions 229. When the two end caps 223 are connected to the sliding block body 221, the two ball holder portions 229 that are parallel to the circulation channel 225 and on the same level (or opposite to each other) are connected to each other to constitute a ball holder penetrating through the sliding block body 221. In this embodiment, the end cap 223 and the ball holder portions 229 thereof can be a single piece formed by injection molding or different pieces individually formed and then assembled together.

Furthermore, one of the two ball holder portions which correspond to each other on the same level includes a protrusion PJ, and the other ball holder portion includes an indentation RC, and they can be connected to each other by the connection between the protrusion PJ and the indentation RC.

As shown in FIG. 8, in this embodiment, the inside of the sliding block body 221 is configured with two ball holders B corresponding to the rail grooves 211. Each of the ball holders B is disposed between the two inner circulation grooves 224 on the same side and extended to have the same length as the length of the sliding block body 221.

Moreover, considering the location of the ball holder, the ball holders formed by the ball holder portions 229 of the end caps 223 are the upper and lower ball holders of the linear motion module 2, respectively, and the ball holder B of the sliding block body 221 is the middle ball holder. Regarding the functionality, the upper ball holder and the middle ball holder are disposed as clipping the upper inner circulation passage, and the middle ball holder and the lower ball holder are disposed as clipping the lower inner circulation passage, and therefore the balls can be kept when the sliding block 22 separates from the linear rail 21.

So far, according to the linear motion module of the invention, by disposing the circulation elements in the circulation channels, the diameter of the ball circulation passage can be kept uniform, the roughness of the passage surface can be reduced, and therefore the passage is formed without sectional difference, the noise during the motion of the linear motion module is reduced and the stability of the whole structure is enhanced. Besides, because the circulation elements can be formed integrally and connected with the sliding block body, the number of the components, the assembly time and the cost can be all reduced.

As shown in FIG. 3, in this embodiment, the sliding block 22 further includes four dust-proof elements $DP_1$ and $DP_2$. The two dust-proof elements $DP_2$ are connected to the bottom side of the sliding block body 221, and the other two dust-proof elements $DP_1$ are disposed between the top side of the linear rail 21 and the upper ball holder. The dust-proof elements $DP_1$ and $DP_2$ are all for blocking dust or external objects from entering into the inside of the linear motion module 2 through the interval or gap of the linear rail 21 and the sliding block body 221. Additionally, as shown in FIG. 3, the sliding block 22 of this embodiment can further include a front-end-cap dust-proof element $DP_3$ and a rear-end-cap dust-proof element $DP_4$, which are disposed on the sides of the end caps 223 away from the end surfaces ES, respectively, for preventing external objects from entering into the inside through the front or rear end of the sliding block 22.

In addition to the above embodiment, there are some variations about the linear motion module, emphasizing the change of the circulation element and circulation channel, with the illustration as below. However, since other portions of the linear motion module can be comprehended by referring to the above embodiment, they are not described here for conciseness.

Figure 9:
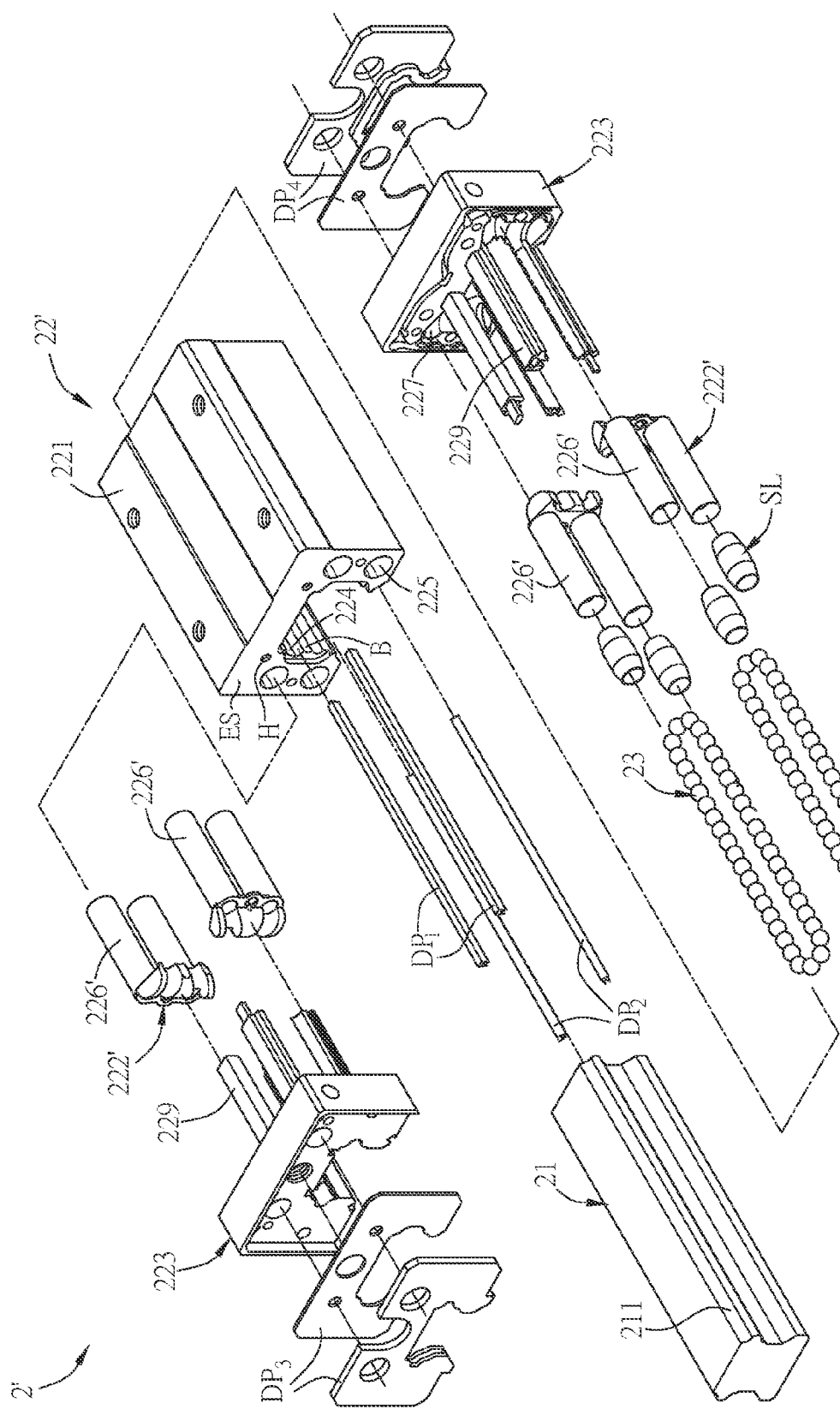
FIG. 9 is a schematic exploded diagram of a linear motion module according to another embodiment of the invention.
Figure 10:
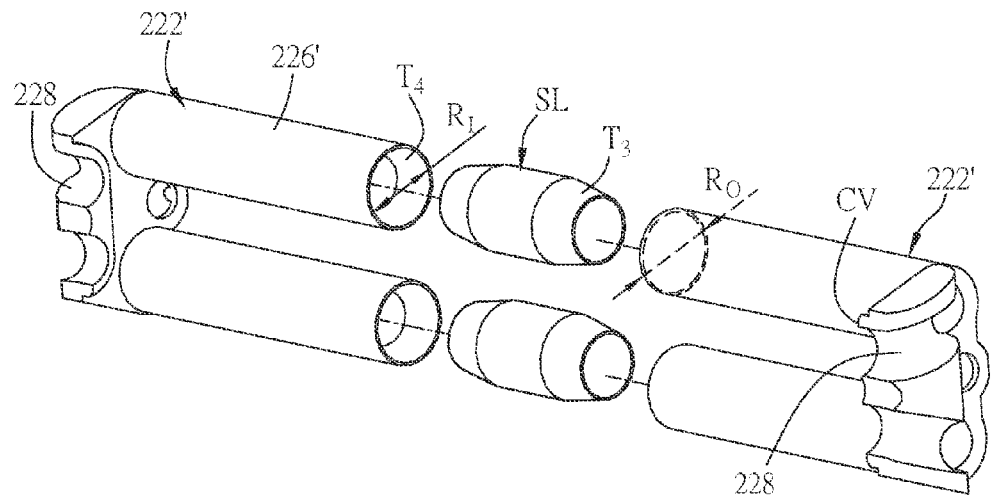
FIG. 10 is a schematic diagram of the opposite two circulation elements and the self-lubricating elements in FIG. 9.
Figure 11:
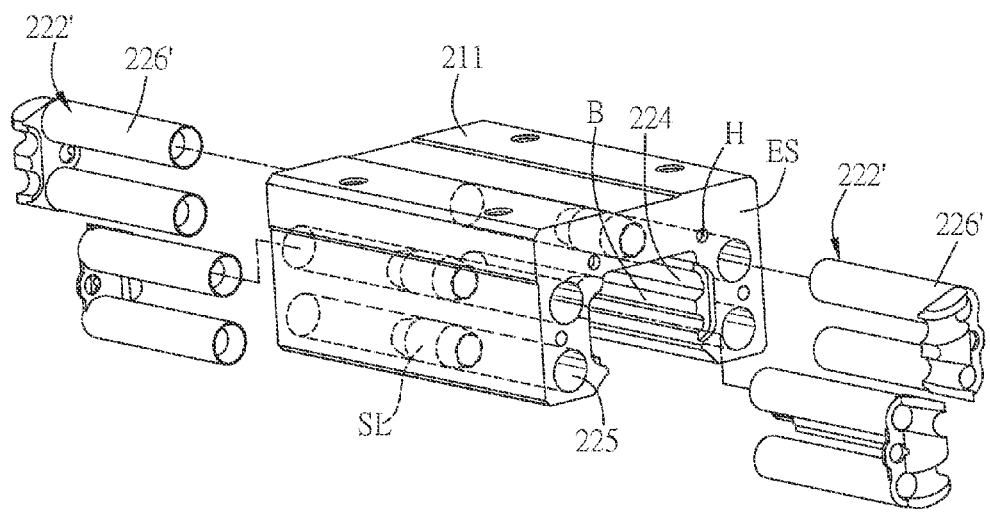
FIG. 11 is a schematic diagram of the connection between the sliding block body and the circulation elements in FIG. 9.

As shown in FIGS. 9 to 11, the sliding block 22' can further include at least two self-lubricating elements SL. In this embodiment, the sliding block 22' includes four self-lubricating elements SL disposed corresponding to the four circulation channels 255, respectively. The self-lubricating element SL is a part of the circulation passage (as shown in FIG. 11, the inner wall of the self-lubricating element SL is a part of the inner wall of the ball circulation passage) and has a member storing lubricant therein, so the balls 23 can be lubricated when passing through the self-lubricating element SL and the purpose of lubrication is achieved.

As shown in FIGS. 10 and 11, in this embodiment, the opposite two circulation tubes 226' are connected together through the self-lubricating element SL. In the assembly of the linear motion module 2', the self-lubricating elements SL can be disposed in the circulation channels 255, and then the circulation elements 222' are disposed on the two sides of each of the end surfaces ES of the sliding block body 221 so that the circulation tubes 226' can connect to the self-lubricating elements SL. The two ends of the self-lubricating element SL have a taper T3 to fit the opposite two circulation tubes 226' having a corresponding taper T4, constituting the outer circulation passage all together. The two opening ends of the self-lubricating element SL favorably have a trumpet-like shape with a diameter slightly larger than the inner diameter $R_I$ of the circulation tube 226', for enhancing the stability of the entering condition of the balls 23. Moreover, the variation of the outer diameter $R_o$ of the taper $T_3$ (i.e. the largest outer diameter $R_o$ minus the smallest outer diameter $R_o$) is favorably about 0 to 0.15 times the diameter of the ball 23, and the length of the taper $T_3$ is favorably about 0 to 2 times the diameter of the ball 23.

The material of the self-lubricating element SL is, for example unlimitedly, metal, plastic or resin material. Favorably, the material of the self-lubricating element SL is metal, so it has stronger rigidity and is more suitable for the case where the circulation element 222' is formed in the sliding block body 221 by injection molding. In this case, the metallic self-lubricating elements SL and the sliding block body 221 are inserted into the mold, and then the injection molding is performed, so that the circulation elements 222', the self-lubricating elements SL and the sliding block body 221 are combined together, and besides, the opposite two circulation tubes 226' are fixed and connected to the self-lubricating element SL to constitute the outer circulation passage together. In this case, the connection between the circulation tube 226' and the self-lubricating element SL also has no sectional difference substantially (e.g. the sectional difference is smaller than 0.1 times the diameter of the ball 23).

In summary, according to the linear motion module of the invention, the circulation element can replace the circulation channel to act a part of the outer circulation passage, so the machining defect of the circulation channel is not a problem anymore and the circulation passage can have uniform diameter. Besides, because the manufacturing method and connection relationship of the circulation element are favorable to form the passage wall without sectional difference, the noise during the motion of the linear motion module can be reduced and the motion stability of the balls can be enhanced. Furthermore, when the positioning structure and/or the self-lubricating element are applied in the invention, the positioning and/or lubricating functions can be provided. Moreover, because the opposite two circulation elements and/or the end caps with the ball holders can be made by an integrally forming manner, the number of the components, the cost and the machining steps can be all reduced and therefore the tolerance caused by the multiple assemblies can be avoided.

In comparison with the prior art, due to the structural design, the linear motion module of the invention can overcome the disadvantages such as the taper of the tube diameter or the roughness of the passage surface, which are unfavorable to the motion of the balls, and therefore the noise during the motion can be reduced and the motion stability can be increased. Besides, by the self-lubricating element providing the lubricant, the interference between the balls or between the balls and the circulation passage can be reduced. When the integrally forming method is applied to the linear motion module of the invention, the number of the components can be reduced and the components within the sliding block can be combined as a single piece. Therefore, the circulation passage can tightly fit the sliding block body to obtain stronger supporting force, and thus the passage vibration during the motion of the balls can be avoided.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A linear motion module, comprising:
    a linear rail, two sides of which are configured with at least a rail groove each;
    a sliding block slidingly disposed on the linear rail and comprising:
    a sliding block body, wherein the inside of the sliding block body is configured with at least two inner circulation grooves, each of the inner circulation grooves correspond to each rail groove, the inner circulation grooves and the rail groove constitute an inner circulation passage, and each of two sides of the sliding block body is configured with at least a circulation channel that corresponds to the inner circulation passage and penetrates through the sliding block body;
    at least four circulation elements disposed on the two sides of each of two end surfaces of the sliding block body, respectively, wherein each of the circulation elements includes at least a circulation tube disposed in the corresponding circulation channel, and the opposite two circulation tubes are connected to each other to constitute an outer circulation passage; and
    two end caps disposed on the two end surfaces of the sliding block body, respectively, wherein each of the end caps is configured with at least two circulation guiding grooves, and each of the circulation guiding grooves is correspondingly connected to the inner circulation passage and the outer circulation passage; and
    a plurality of balls moving in circles through the inner circulation passage, one of the circulation guiding grooves, the outer circulation passage and the other circulation guiding groove;
    wherein the sliding block further includes at least two self-lubricating elements, which are disposed in the circulation channels respectively, and the opposite two circulation tubes are connected together through each of the self-lubricating elements.

2. The linear motion module as recited in claim 1, wherein the opposite two circulation tubes have corresponding tapers at the connection and are connected together in a sleeve manner to constitute the outer circulation passage.

3. The linear motion module as recited in claim 1, wherein the opposite two circulation tubes are integrally formed.

4. The linear motion module as recited in claim 1, wherein the opposite two circulation tubes are connected to each other by adhering.

5. The linear motion module as recited in claim 1, wherein the opposite two circulation tubes are formed in the sliding block body by injection molding to be combined with the self-lubricating element and the sliding block body as one piece.

6. The linear motion module as recited in claim 1, wherein two ends of the self-lubricating element have tapers to be covered by the opposite two circulation tubes, respectively.

7. The linear motion module as recited in claim 1, wherein the opposite two circulation tubes are connected to the self-lubricating element by adhering.

8. The linear motion module as recited in claim 1, wherein each of the circulation elements includes at least one circulation curving groove, one end of the circulation curving groove is connected to the circulation tube, and the circulation curving groove and the circulation guiding groove constitute a circulation curving passage which connects to the inner circulation passage and the outer circulation passage.

9. The linear motion module as recited in claim 8, wherein each of two ends of each of the inner circulation grooves includes an indentation, the other end of the circulation curving groove includes a protrusion, and the circulation curving passage is connected to the inner circulation passage by the connection between the indentation and the protrusion.

10. The linear motion module as recited in claim 9, wherein the connection between the indentation and the protrusion has no substantial section difference.

11. The linear motion module as recited in claim 1, wherein the inside of the sliding block body is configured with at least two ball holders corresponding to the rail groove for limiting the movement of the balls relative to the sliding block body.

12. The linear motion module as recited in claim 1, wherein each of the end caps further has at least two ball holder portions integrally formed with the end cap, the opposite two ball holder portions parallel to the circulation channel are connected to each other to constitute a ball holder.

13. The linear motion module as recited in claim 12, wherein one of the opposite two ball holder portions includes a protrusion, the other ball holder portion includes an indentation, and the ball holder portions constitute a ball holder by the connection between the protrusion and the indentation.

\* \* \* \* \*